US011345364B2

(12) United States Patent
Seo

(10) Patent No.: US 11,345,364 B2
(45) Date of Patent: May 31, 2022

(54) ATTENTION CALLING DEVICE AND ATTENTION CALLING METHOD

(71) Applicant: HONDA MOTOR CO., LTD., Tokyo (JP)

(72) Inventor: Toshiaki Seo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/174,620

(22) Filed: Feb. 12, 2021

(65) Prior Publication Data

US 2021/0269052 A1 Sep. 2, 2021

(30) Foreign Application Priority Data

Feb. 28, 2020 (JP) .............................. JP2020-033658

(51) Int. Cl.
*B60Q 1/00* (2006.01)
*B60W 50/14* (2020.01)
*B60W 30/12* (2020.01)
*B60W 30/165* (2020.01)

(52) U.S. Cl.
CPC ........... *B60W 50/14* (2013.01); *B60W 30/12* (2013.01); *B60W 30/165* (2013.01); *B60W 2050/146* (2013.01); *B60W 2554/4041* (2020.02)

(58) Field of Classification Search
CPC .... B60W 50/14; B60W 30/12; B60W 30/165; B60W 2050/146; B60W 2554/4041; B60K 2370/1529; B60K 2370/177; B60K 2370/178; B60K 2370/179; B60K 35/00; B60R 1/00

See application file for complete search history.

(56) References Cited

U.S. PATENT DOCUMENTS

| 10,933,745 B2* | 3/2021 | Shimotani | .............. G05D 1/021 |
| 2021/0372810 A1* | 12/2021 | Hato | ....................... G06T 13/80 |
| 2022/0016980 A1* | 1/2022 | Takemori | ................. G08G 1/00 |
| 2022/0084458 A1* | 3/2022 | Sakuma | ................. G09G 5/377 |

FOREIGN PATENT DOCUMENTS

JP 2017-021546 1/2017

* cited by examiner

*Primary Examiner* — Toan N Pham
(74) *Attorney, Agent, or Firm* — Rankin, Hill & Clark LLP

(57) ABSTRACT

An attention calling device includes: a processor configured to execute an attention load reduction region setting process that sets an attention load reduction region that is a region monitored by a drive assisting device provided in a subject vehicle according to a drive assisting function exerted by operating the drive assisting device, and a display control process that performs an attention calling process by displaying a virtual image for the attention load reduction region in such a manner that conspicuity of the virtual image is lower than a region other than the attention load reduction region based on a position of the attention load reduction region recognized by a target object position recognizing process during operation of the drive assisting device.

10 Claims, 10 Drawing Sheets

ATTENTION CALLING DEVICE AND ATTENTION CALLING METHOD

INCORPORATION BY REFERENCE

The present application claims priority under 35 U.S.C. § 119 to Japanese Patent Application No. 2020-033658 filed on Feb. 28, 2020. The content of the application is incorporated herein by reference in its entirety.

BACKGROUND OF THE INVENTION

Field of the Invention

The present invention relates to an attention calling device and an attention calling method.

Description of the Related Art

There has been conventionally known an image display system for vehicles in which a target object present in front of a vehicle is detected by a camera, a radar or the like, and a head up display (HUD) displays a marking image of the target object as overlapping the actual target object across the windshield (see Japanese Patent Laid-Open No. 2017-21546, for example). In the above-mentioned image display system for vehicles, a display attribute of the marking image is adjusted and changed according to the degree of effect that can be caused by the detected target object on the vehicle.

In recent years, vehicles have been provided with various drive assisting functions, and there has been an attempt to reduce the driver's load of attention to the surroundings of the vehicle by operating the drive assisting functions. Thus, during the operation of the drive assisting functions, instead of calling attention in a uniform manner as in the conventional system described above, it is desirable to call attention more appropriately according to how the driver's attention load is reduced by operating the drive assisting functions.

The present invention has been made in view of this background, and it is an objective of the present invention to provide an attention calling device and an attention calling method capable of calling attention more appropriately according to how the driver's attention load is reduced by operating a drive assisting function.

SUMMARY OF THE INVENTION

A first aspect for achieving the above-mentioned objective includes an attention calling device including: a processor configured to execute a target object position recognizing process that recognizes a position of a target object in front of a subject vehicle, and a display control process that controls image display on a display device provided in the subject vehicle and performs an attention calling process to cause the display device to display a virtual image corresponding to the target object such that the virtual image is visually recognized by a driver of the subject vehicle as overlapping the target object based on the position of the target object recognized by the target object position recognizing process, wherein the processor executes an attention load reduction region setting process that sets an attention load reduction region that is a region monitored by a drive assisting device comprised in the subject vehicle according to a drive assisting function exerted by operating the drive assisting device, regards the attention load reduction region as the target object and recognizes a position of the attention load reduction region in the target object position recognizing process, and performs the attention calling process by displaying the virtual image for the attention load reduction region in such a manner that conspicuity of the virtual image is lower than a region other than the attention load reduction region based on the position of the attention load reduction region recognized by the target object position recognizing process during operation of the drive assisting device in the display control process.

The attention calling device above may be configured such that the processor regards an object positioned in front of the subject vehicle as the target object and recognizes a position of the object in the target object position recognizing process, and when the position of the object is recognized by the target object position recognizing process during operation of the drive assisting device, the processor performs the attention calling process by displaying the virtual image of the object in a first display manner when the position of the object is outside the attention load reduction region, and performs the attention calling process by displaying the virtual image of the object in a second display manner with lower conspicuity than the first display manner when the position of the object is inside the attention load reduction region.

A second aspect for achieving the above-mentioned objective includes an attention calling device including: a processor configured to execute a target object position recognizing process that recognizes a position of a target object present in front of a subject vehicle, and a display control process that controls image display on a display device provided in the subject vehicle and performs an attention calling process to cause the display device to display a virtual image corresponding to the target object such that the virtual image is visually recognized by a driver of the subject vehicle as overlapping the target object based on the position of the target object recognized by the target object position recognizing process, wherein the processor executes an attention load reduction region setting process that sets an attention load reduction region that is a region monitored by a drive assisting device comprised in the subject vehicle according to a drive assisting function exerted by operating the drive assisting device, the processor regards an object positioned in front of the subject vehicle as the target object and recognizes a position of the object in the target object position recognizing process, and when the position of the object is recognized by the target object position recognizing process during operation of the drive assisting device, the processor performs the attention calling process by displaying the virtual image corresponding to the object in a second display manner in which conspicuity of the virtual image is lower than a region other than the attention load reduction region when the position of the object is inside the attention load reduction region in the display control process.

The attention calling device above may be configured such that the drive assisting function of the drive assisting device is a following-distance maintaining function for recognizing a position of a first preceding vehicle traveling in front of the subject vehicle and allowing the subject vehicle to follow the first preceding vehicle while maintaining a following distance to the first preceding vehicle, and the processor sets, as the attention load reduction region, a first region based on the position of the first preceding vehicle recognized by the drive assisting device having the following-distance maintaining function in the attention load reduction region setting process.

The attention calling device above may be configured such that the drive assisting function of the drive assisting device is a lane maintaining function for recognizing a subject-vehicle lane in which the subject vehicle is traveling and performing steering control of the subject vehicle such that the subject vehicle travels in the subject-vehicle lane, and the processor sets, as the attention load reduction region, a second region based on an area of another lane adjacent to the subject-vehicle lane recognized by the drive assisting device having the lane maintaining function in the attention load reduction region setting process.

The attention calling device above may be configured such that the drive assisting function of the drive assisting device is a preceding-vehicle start notification function for recognizing an indication state of a traffic signal in front of the subject vehicle and a traveling condition of a second preceding vehicle in front of the subject vehicle and notifying the driver that the second preceding vehicle has started when a transition occurs from a state where the traffic signal shows a stop indication and the second preceding vehicle is stopped to a state where the traffic signal shows a proceed indication and the second preceding vehicle has started, and the processor sets, as the attention load reduction region, a third region including an area occupied by the second preceding vehicle and excluding an area occupied by the traffic signal in the attention load reduction region setting process.

The attention calling device above may be configured such that the processor lowers conspicuity of the virtual image by performing at least one of a process of lowering lightness of the virtual image, a process of lowering saturation of the virtual image, and a process of decreasing a difference in hue between the virtual image and a background of the virtual image in the display control process.

A third aspect for achieving the above-mentioned objective includes an attention calling method at a computer, the method including: recognizing a position of a target object in front of a subject vehicle; controlling image display on a display device provided in the subject vehicle and performing an attention calling process to cause the display device to display a virtual image corresponding to the target object such that the virtual image is visually recognized by a driver of the subject vehicle as overlapping the target object based on the position of the target object; setting an attention load reduction region that is a region monitored by a drive assisting device comprised in the subject vehicle according to a drive assisting function exerted by operating the drive assisting device; regarding the attention load reduction region as the target object and recognizing a position of the attention load reduction region; and performing the attention calling process by causing the display device to display the virtual image for the attention load reduction region in such a manner that conspicuity of the virtual image is lower than a region other than the attention load reduction region based on the position of the attention load reduction region during operation of the drive assisting device.

A fourth aspect for achieving the above-mentioned objective includes an attention calling method at a computer, the method including: recognizing a position of a target object present in front of a subject vehicle; controlling image display on a display device provided in the subject vehicle and performing an attention calling process to cause the display device to display a virtual image of the target object such that the virtual image is visually recognized by a driver of the subject vehicle as overlapping the target object based on the position of the target object; setting an attention load reduction region that is a region monitored by a drive assisting device comprised in the subject vehicle according to a drive assisting function exerted by operating the drive assisting device; regarding an object positioned in front of the subject vehicle as the target object and recognizing a position of the object; and performing the attention calling process by displaying the virtual image corresponding to the object in a second display manner in which conspicuity of the virtual image is lower than a region other than the attention load reduction region when the position of the object is recognized during operation of the drive assisting device and the position of the object is inside the attention load reduction region.

The attention calling method of the fourth aspect above may be configured such that further including at the computer: performing the attention calling process by displaying the virtual image corresponding to the object in a first display manner with higher conspicuity than the second display manner when the position of the object is recognized during operation of the drive assisting device and the position of the object is outside the attention load reduction region.

Advantageous Effect of Invention

According to the attention calling device above, an attention load reduction region that is a region monitored by a drive assisting device is set according to a drive assisting function exerted by operating the drive assisting device, and a display control unit performs an attention calling process by displaying a virtual image of the attention load reduction region in such a manner that conspicuity of the virtual image is lower than a region other than the attention load reduction region based on a position of the attention load reduction region recognized by the target object position recognizing unit during operation of the drive assisting device.

In this manner, it can be expected that the driver pays attention to the outside of the attention load reduction region with higher priority, and thus it is possible to call attention more appropriately according to how the driver's attention load is reduced by operating the drive assisting function.

DETAILED DESCRIPTION OF THE PREFERRED EMBODIMENT

Figure 1:
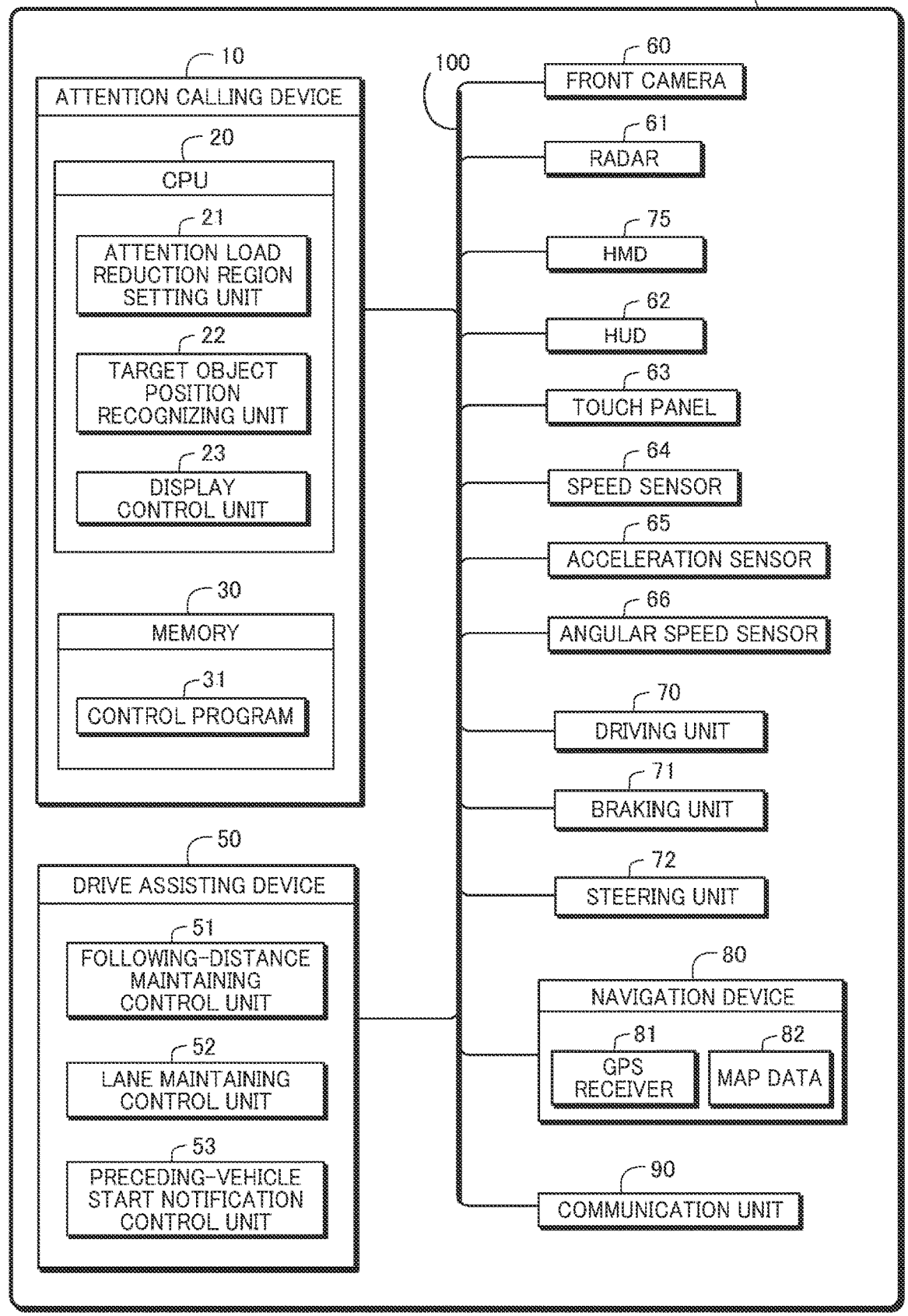
FIG. 1 is a configurational view of an attention calling device and a vehicle provided with the attention calling device.

1. Configurations of Attention Calling Device and Vehicle

The configurations of an attention calling device 10 of the present embodiment and a subject vehicle 1 provided with the attention calling device 10 will be described with reference to FIGS. 1 to 3. The subject vehicle 1 includes the attention calling device 10, a drive assisting device 50, a front camera 60, a radar 61, a HMD (Head Mounted Display) 75, a HUD (Head Up Display) 62, a touch panel 63, a speed sensor 64, an acceleration sensor 65, an angular speed sensor 66, a driving unit 70, a braking unit 71, a steering unit 72, a navigation device 80, and a communication unit 90, which are communicatively connected to each other by a CAN (Controller Area Network) 100.

The HMD 75 and the HUD 62 correspond to a display device of the present invention. Although a case where an attention calling process is performed by controlling image display on the HUD 62 will be described below, a similar process will be applied to a case where the attention calling process is performed by controlling image display on the HMD 75.

Figure 2:
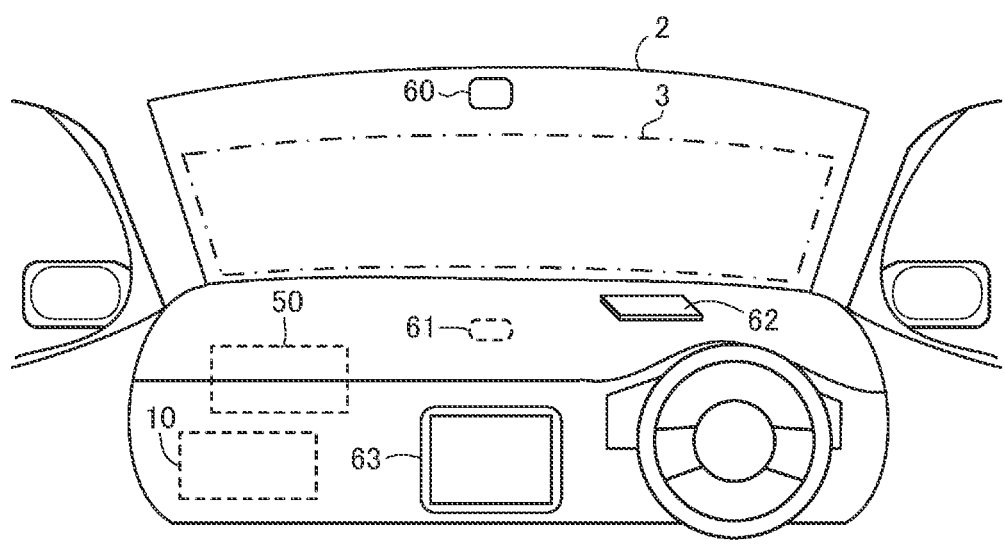
FIG. 2 is an illustrative diagram of an external appearance of a front part of the vehicle interior.
Figure 3:
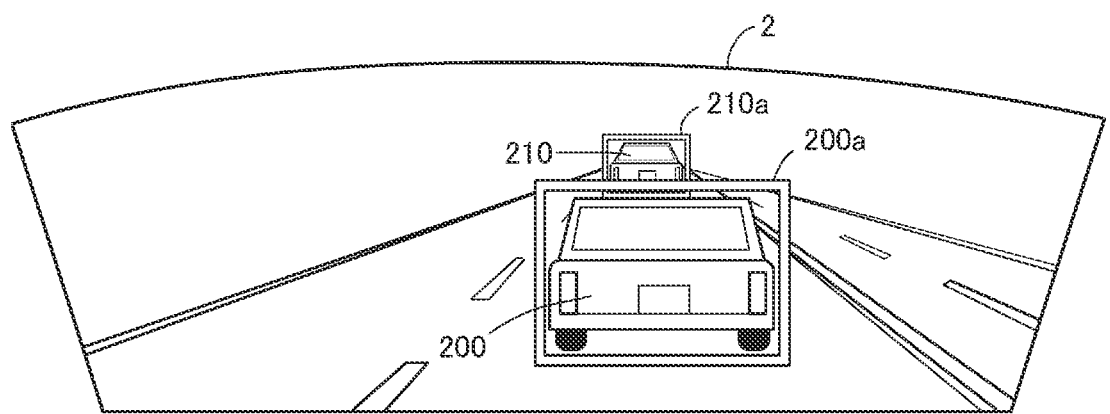
FIG. 3 is an illustrative diagram of attention calling display by a HUD.

As shown in FIG. 2, the front camera 60 is arranged at an upper portion of a windshield 2 of the vehicle 1, for example, and captures images in front of the vehicle 1. The radar 61 is arranged on the front grille (not shown) of the vehicle 1, for example, and detects the position of a target object present in front of the vehicle 1. The HUD 62 projects and displays various information displaying images in a predetermined display area 3 of the windshield 2. The images projected by the HUD 62 are visually recognized by the driver of the vehicle 1 across the windshield 2.

The touch panel 63 displays information to an occupant of the vehicle 1 and detects a touch operation by the occupant. The speed sensor 64 detects the traveling speed of the vehicle 1, and the acceleration sensor 65 detects the acceleration of the vehicle 1. The angular speed sensor 66 detects the angular speed of the vehicle 1. The driving unit 70, the braking unit 71, and the steering unit 72 perform the driving, deceleration, and steering of the vehicle 1, respectively.

The navigation device 80 includes a GPS (Global Positioning System) sensor 81 for detecting the current position of the vehicle 1 and map data 82, and performs route guidance to a destination and the like. The communication unit 90 performs communication with a communication terminal, road equipment, a server, and the like.

The drive assisting device 50 is a control unit composed of a CPU, a memory, and the like, which are not shown. The drive assisting device 50 performs a drive assisting process for assisting the driving of the vehicle 1 by controlling the operation of the driving unit 70, the braking unit 71, and the steering unit 72 based on surrounding conditions of the vehicle 1 recognized by the front camera 60 and the radar 61, traveling conditions of the vehicle 1 detected by the speed sensor 64, the acceleration sensor 65, and the angular speed sensor 66, conditions of the road on which the vehicle 1 is traveling detected by the navigation device 80, traffic conditions received by the communication unit 90, and the like.

In the present embodiment, the drive assisting device 50 includes a following-distance maintaining control unit 51 that performs following-distance maintaining control for implementing a following-distance maintaining function, a lane maintaining control unit 52 that performs lane maintaining control for implementing a lane maintaining function, and a preceding-vehicle start notification control unit 53 that performs preceding-vehicle start notification control for implementing a preceding-vehicle start notification function. The details of the following-distance maintaining function, the lane maintaining function, and the preceding-vehicle start notification function will be described later.

The attention calling device 10 is a control unit composed of a CPU 20 (which corresponds to a processor and computer of the present invention), a memory 30, and the like. The CPU 20 functions as an attention load reduction region setting unit 21, a target object position recognizing unit 22, and a display control unit 23 by reading and executing a control program 31 for the attention calling device 10 stored in the memory 30.

A process performed by the target object position recognizing unit 22 corresponds to a target object position recognizing step in an attention calling method of the present invention, and a process performed by the attention load reduction region setting unit 21 corresponds to an attention load reduction region setting step in the attention calling method of the present invention. A process performed by the display control unit 23 corresponds to a display control step in the attention calling method of the present invention.

The attention load reduction region setting unit 21 sets an attention load reduction region that is a region monitored by the drive assisting device 50 according to a following-distance maintaining function, a lane maintaining function, or a preceding-vehicle start notification function exerted by operating the drive assisting device 50. The target object position recognizing unit 22 regards the attention load reduction region and an object (another vehicle, a pedestrian, road equipment, or the like) located in front of the vehicle 1 as target objects, and recognizes the positions of the target objects.

The display control unit 23 controls image display on the HUD 62 and performs an attention calling process to perform attention calling display to the driver of the subject vehicle 1. FIG. 3 shows an example of attention calling display in which the positions of preceding vehicles 200 and 210 are recognized by the target object position recognizing unit 22. In the example of FIG. 3, the display control unit 23 causes the HUD 62 to project virtual images 200a and 210a of the preceding vehicles 200 and 210 on the windshield 2. At that time, the display control unit 23 sets the projection positions of the virtual images 200a and 210a such that the virtual image 200a of the preceding vehicle 200 is visually recognized by the driver as overlapping the preceding vehicle 200 across the windshield 2 and the virtual image 210a of the preceding vehicle 210 is visually recognized by the driver as overlapping the preceding vehicle 210 across the windshield 2. This can make it easier for the driver to visually recognize the positions of the preceding vehicles 200 and 210 to attract attention to the preceding vehicles 200 and 210. Note that the shapes of the virtual images are not limited to frames enclosing the target objects as shown in FIG. 3, and may be shapes covering the entire target objects or the like.

2. Attention Calling Process According to Operation of Drive Assisting Device An attention calling process performed by the display control unit 23 according to the above-mentioned drive assisting functions (the following-distance maintaining function, the lane maintaining function, and the preceding-vehicle start notification function) exerted by operating the drive assisting device 50 will be described with reference to the flow chart shown in FIG. 4. The attention calling device 10 repeatedly performs the processes in the flow chart shown in FIG. 4 while the vehicle 1 is used.

Figure 4:
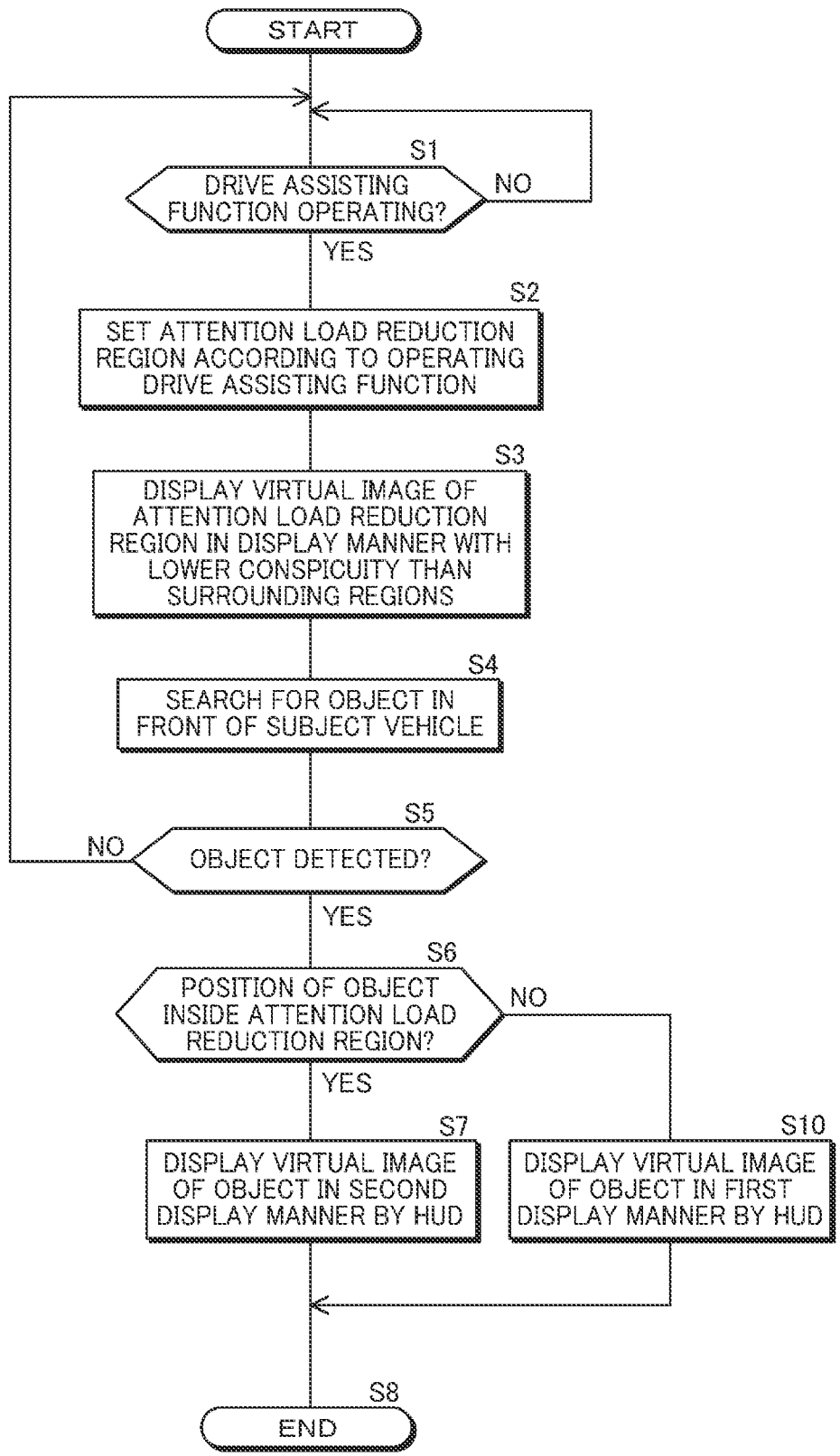
FIG. 4 is a flow chart of an attention calling process.

Steps S1 to S2 in FIG. 4 are processes performed by the attention load reduction region setting unit 21. The attention load reduction region setting unit determines whether a drive assisting function is operating in step S1, and advances the process to step S2 when the drive assisting function is operating. In step S2, the attention load reduction region setting unit 21 sets the attention load reduction region according to the drive assisting function that is operating.

Subsequently, in step S3, the display control unit 23 causes the HUD 62 to project a virtual image of the attention load reduction region on the windshield 2 in a display manner with lower conspicuity than surrounding regions. This allows the driver to pay attention to the area outside the attention load reduction region with higher priority than inside the attention load reduction region. Here, as the method of lowering the conspicuity of the virtual image, any of (1) to (3) below or any combination of (1) to (3) can be employed, for example.

(1) Making the lightness of the corresponding virtual image lower than the actual lightness of the target object and the surrounding regions.

(2) Making the saturation of the corresponding virtual image lower than the actual saturation of the target object and the surrounding regions.

(3) Making the difference in hue between the corresponding virtual image and the background of the virtual image smaller than the actual difference in hue between the target object and the background of the target object.

In order to lower the conspicuity of the virtual image by (1) to (3) above, the display control unit 23 sets the color of the virtual image of the attention load reduction region to a color close to the lightness, saturation, and hue of the road surface around the attention load reduction region, and displays the virtual image superimposed on the attention load reduction region. The display control unit 23 recognizes the lightness, saturation, and hue of the attention load reduction region based on an image captured by the front camera 60. Here, since the color of the road surface visually recognized changes with environments (such as day, night, reflection of the setting sun, road paints, and rain), the display control unit 23 constantly recognizes the lightness, saturation, and hue of the road surface at the time of performing the attention calling process based on images captured by the front camera 60, and adjusts the color of the virtual image of the attention load reduction region.

When a region including a preceding vehicle is set as the attention load reduction region, the display control unit 23 sets a color having lightness, saturation, and hue close to the color around the preceding vehicle. The color around the preceding vehicle is affected by structures such as plantings and buildings around the road under a situation such as a narrow road and is affected by the setting sun and the blue sky such as in a place under the open sky, besides the color of the road surface. Thus, the display control unit 23 constantly recognizes the color around the preceding vehicle at the time of performing the attention calling process based on images captured by the front camera 60, and adjusts the color of the virtual image of the attention load reduction region.

Next steps S4 to S5 are processes performed by the target object position recognizing unit 22. In step S4, the target object position recognizing unit 22 searches for an object in front of the subject vehicle 1 as a target object based on an image captured by the front camera 60 and information of position detection by the radar 61. Subsequently, in step S5, the target object position recognizing unit 22 advances the process to step S6 when the object is detected, and advances the process to step S1 when the object is not detected.

When a plurality of objects are detected, the processes of steps S6 to S7 and S10 are performed for each object, and a virtual image of each object is displayed. In step S6, the display control unit 23 determines whether the position of the detected object is inside the attention load reduction region. When the position of the object is outside the attention load reduction region, the display control unit 23 advances the process to step S10, and causes the HUD 62 to display a virtual image of the object superimposed on the object in a first display manner.

On the other hand, when the position of the object is inside the attention load reduction region, the display control unit 23 advances the process to step S7, and causes the HUD 62 to display a virtual image of the object superimposed on the object in a second display manner with lower conspicuity than the first manner. In this case as well, the display control unit 23 uses the methods (1) to (3) above to lower the conspicuity of the virtual image of the object displayed in the second display manner. This allows the driver to more easily pay attention to an object outside the attention load reduction region than an object inside the attention load reduction region to attract attention to an object outside the attention load reduction region.

3. Attention Calling Process According to Operation of Following-Distance Maintaining Function An attention calling process performed by the attention calling device 10 when the following-distance maintaining control is performed by the following-distance maintaining control unit 51 and the following-distance maintaining function is operating will be described with reference to FIGS. 5 and 6.

Figure 5:
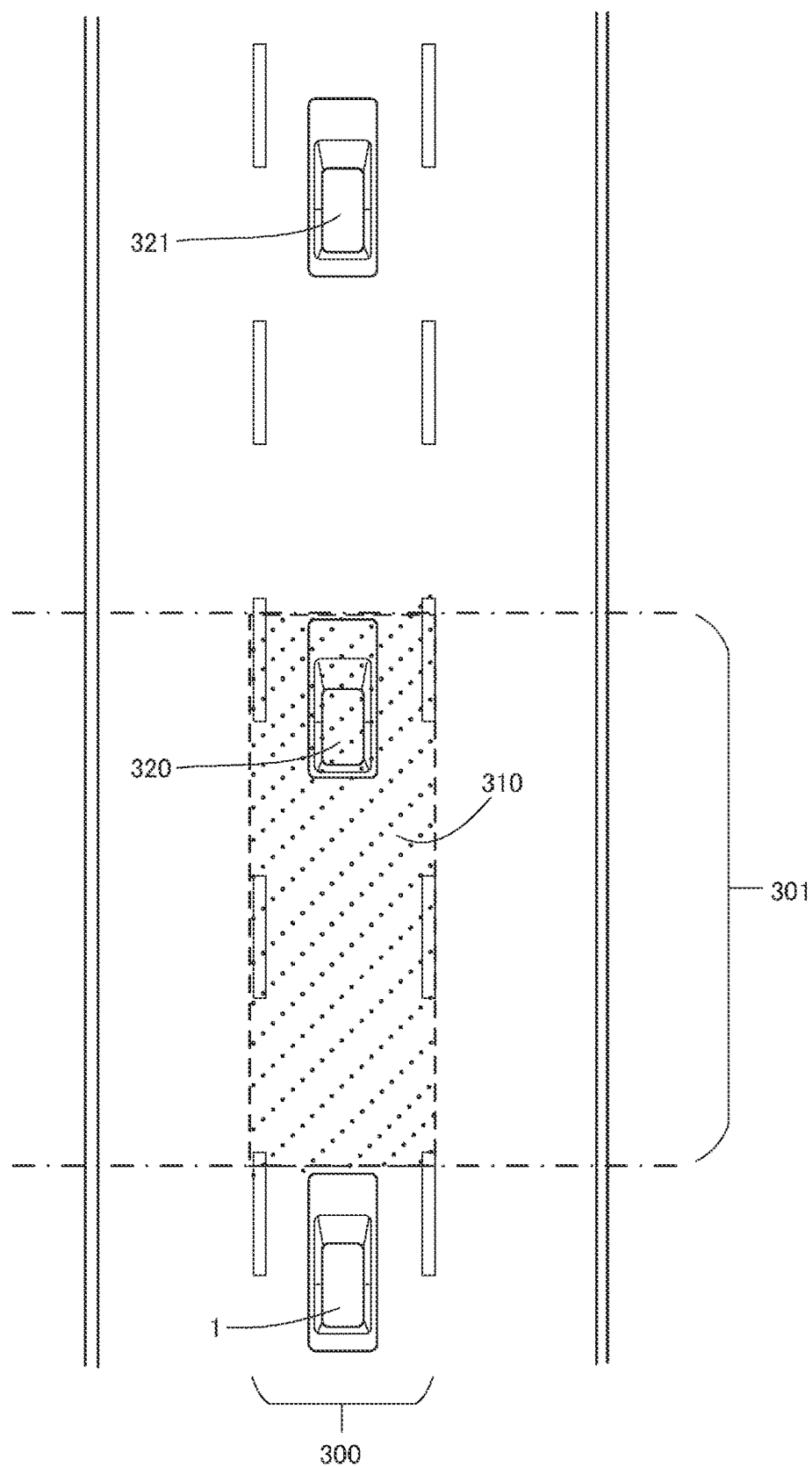
FIG. 5 is an illustrative diagram of an attention load reduction region when a following-distance maintaining function is operating.

FIG. 5 shows a situation where a preceding vehicle 320 and a preceding vehicle 321 are traveling in front of the subject vehicle 1. In this case, the following-distance maintaining control unit 51 recognizes the preceding vehicle 320 (which corresponds to a first preceding vehicle of the present invention) immediately in front by the front camera 60, and detects the position of the preceding vehicle 320 by the radar 61. Then, the following-distance maintaining control unit 51 controls the operation of the driving unit 70, the braking unit 71, and the steering unit 72 such that the distance between the subject vehicle 1 and the preceding vehicle 320 is maintained at a constant distance set according to the traveling speed of the subject vehicle 1 to allow the subject vehicle 1 to follow the preceding vehicle 320.

Figure 6:
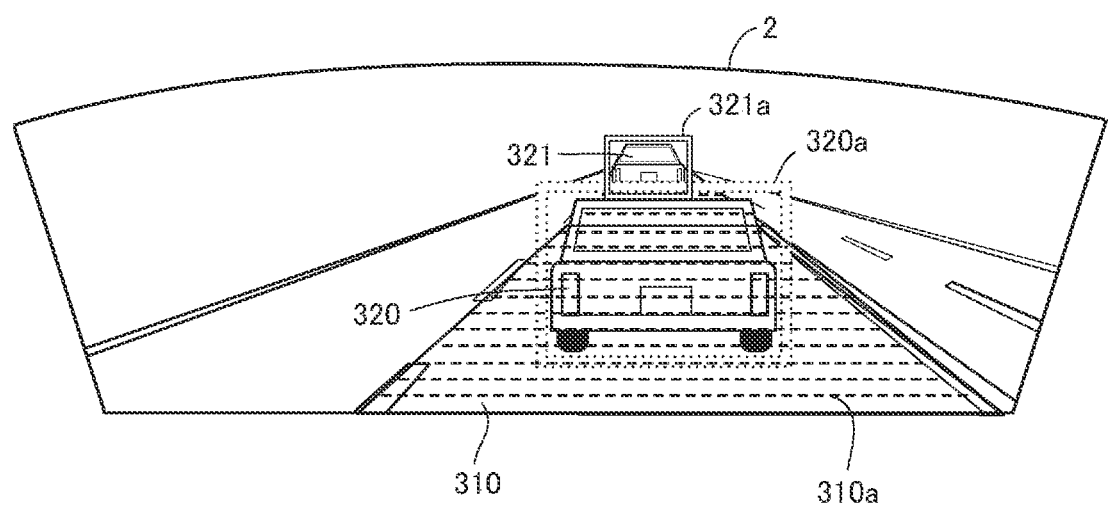
FIG. 6 is an illustrative diagram of attention calling display when the following-distance maintaining function is operating.

The attention load reduction region setting unit 21 sets, as an attention load reduction region 310 (which corresponds to a first region of the present invention), an area 301 from a front end of the subject vehicle 1 to a front end of the preceding vehicle 320 in a subject-vehicle lane 300 in which the subject vehicle 1 is traveling. The target object position recognizing unit 22 recognizes the position of the attention load reduction region 310. The display control unit 23 causes the HUD 62 to display a virtual image 310a of the attention load reduction region 310 as overlapping the attention load reduction region 310 as shown in FIG. 6 based on the position of the attention load reduction region 310 recognized by the target object position recognizing unit 22.

The display control unit 23 displays a virtual image 321a of the preceding vehicle 321 positioned outside the attention load reduction region 310 (beyond the attention load reduction region 310 herein) in the first display manner, and displays a virtual image 320a of the preceding vehicle 230 inside the attention load reduction region 310 in the second display manner with lower conspicuity than the first display manner. This allows the driver of the subject vehicle 1 to more easily pay attention to the preceding vehicle 321 traveling ahead of the attention load reduction region 310 than the preceding vehicle 320 immediately in front to attract attention to the preceding vehicle 321. Note that, although FIG. 6 shows a case where the virtual image 321a corresponding to the preceding vehicle 321 positioned outside the attention load reduction region 310 is displayed in the first display manner with higher conspicuity than the second display manner, there may be a case where the virtual image 321a corresponding to the preceding vehicle 321 is not displayed.

4. Attention Calling Process According to Operation of Lane Maintaining Function A process performed by the attention calling device 10 when the lane maintaining control is performed by the lane maintaining control unit 52 and the lane maintaining function is operating will be described with reference to FIGS. 7 and 8.

Figure 7:
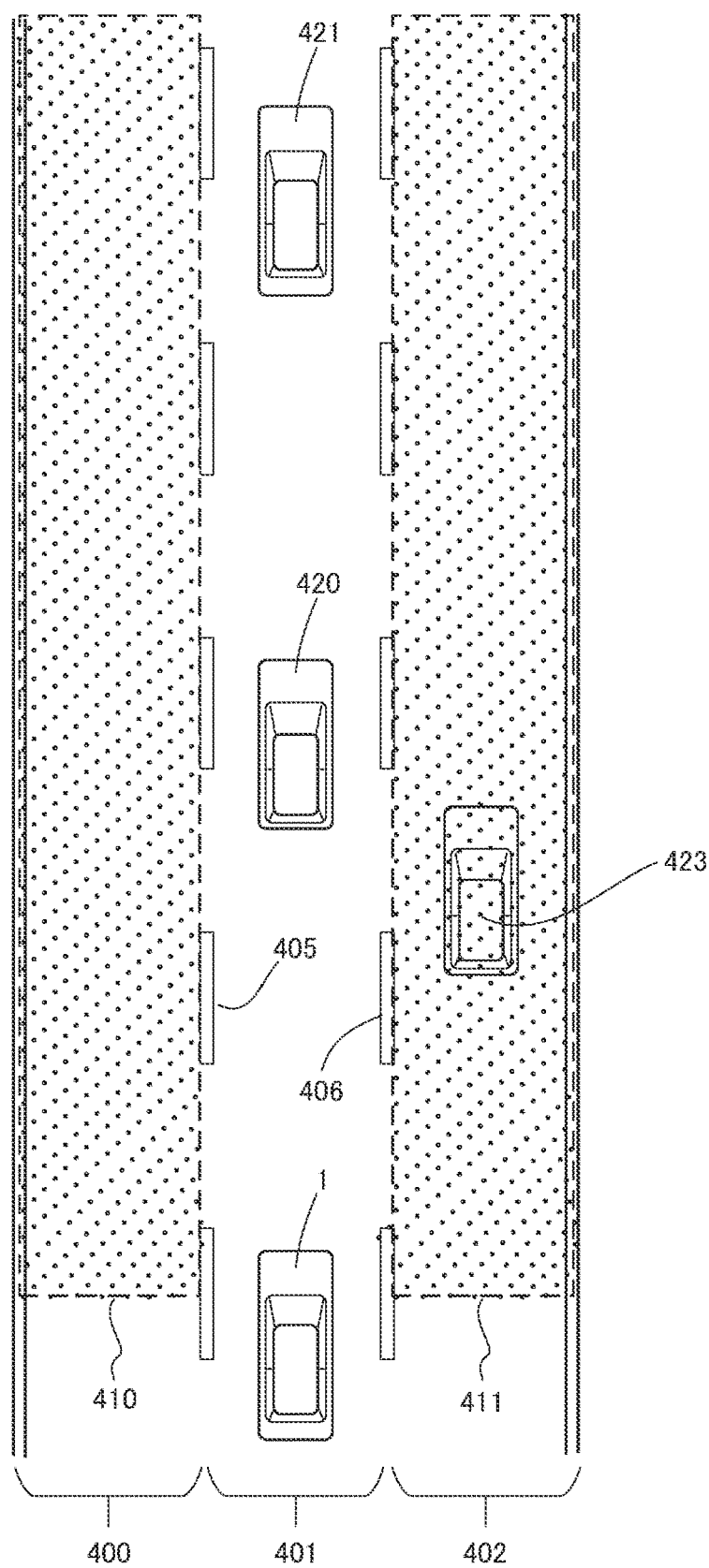
FIG. 7 is an illustrative diagram of an attention load reduction region when a lane maintaining function is operating.

FIG. 7 shows a situation where a preceding vehicle 420 and a preceding vehicle 421 are traveling in front of the subject vehicle 1. In this case, the lane maintaining control unit 52 recognizes boundary lines 405 and 406 between a subject-vehicle lane 401 in which the subject vehicle 1 is traveling and adjacent other lanes 400 and 402 by the front camera 60, and detects the positions of the boundary lines 405 and 406 by the radar 61. Then, the lane maintaining control unit 52 performs steering control of the vehicle 1 by the steering unit 72 such that the subject vehicle 1 travels near the center of the subject-vehicle lane 401 partitioned by the boundary lines 405 and 406.

Figure 8:
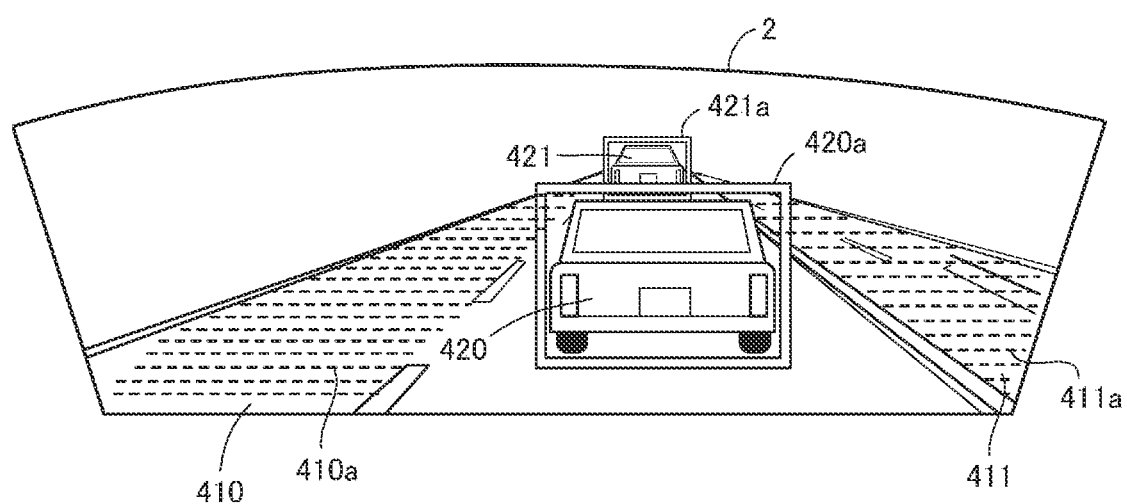
FIG. 8 is an illustrative diagram of attention calling display when the lane maintaining function is operating.

The attention load reduction region setting unit 21 sets, as attention load reduction regions 410 and 411 (which correspond to a second region of the present invention), an area in front of the front part of the subject vehicle 1 in the other lanes 400 and 402 adjacent to the subject-vehicle lane 401 in which the subject vehicle 1 is traveling. The target object position recognizing unit 22 recognizes the positions of the attention load reduction regions 410 and 411. The display control unit 23 causes the HUD 62 to display a virtual image 410a of the attention load reduction region 410 as overlapping the attention load reduction region 410 as shown in FIG. 8 based on the position of the attention load reduction region 410 recognized by the target object position recognizing unit 22. Also, the display control unit 23 causes the HUD 62 to display a virtual image 411a of the attention load reduction region 411 as overlapping the attention load reduction region 411 based on the position of the attention load reduction region 411 recognized by the target object position recognizing unit 22.

In this case, the display control unit 23 sets the conspicuity of the virtual image 410a of the attention load reduction region 410 and the virtual image 411a of the attention load reduction region 411 to be lower than surrounding regions. This allows the driver of the vehicle 1 to pay attention to the subject-vehicle lane 401 rather than the adjacent lanes 400 and 402. The display control unit 23 displays a virtual image 420a of the preceding vehicle 420 as overlapping the preceding vehicle 420, and displays a virtual image 421a of the preceding vehicle 421 as overlapping the preceding vehicle 421.

5. Attention Calling Process According to Operation of Preceding-Vehicle Start Notification Function A process performed by the attention calling device 10 when the preceding-vehicle start notification control is performed by the preceding-vehicle start notification control unit 53 and the preceding-vehicle start notification function is operating will be described with reference to FIG. 9.

Figure 9:
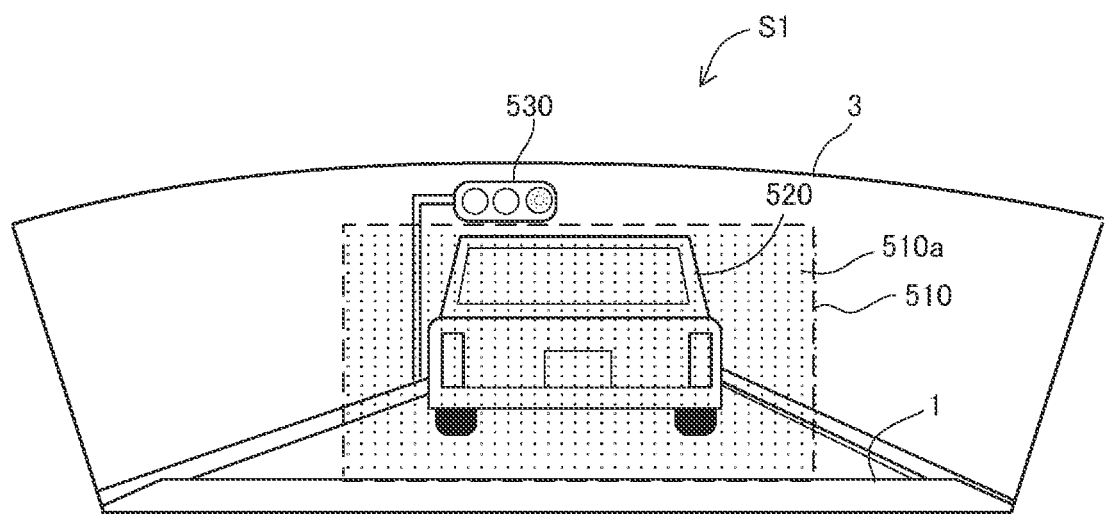
FIG. 9 is an illustrative diagram of an attention load reduction region and attention calling display when a preceding-vehicle start notification function is operating.
Figure 9:
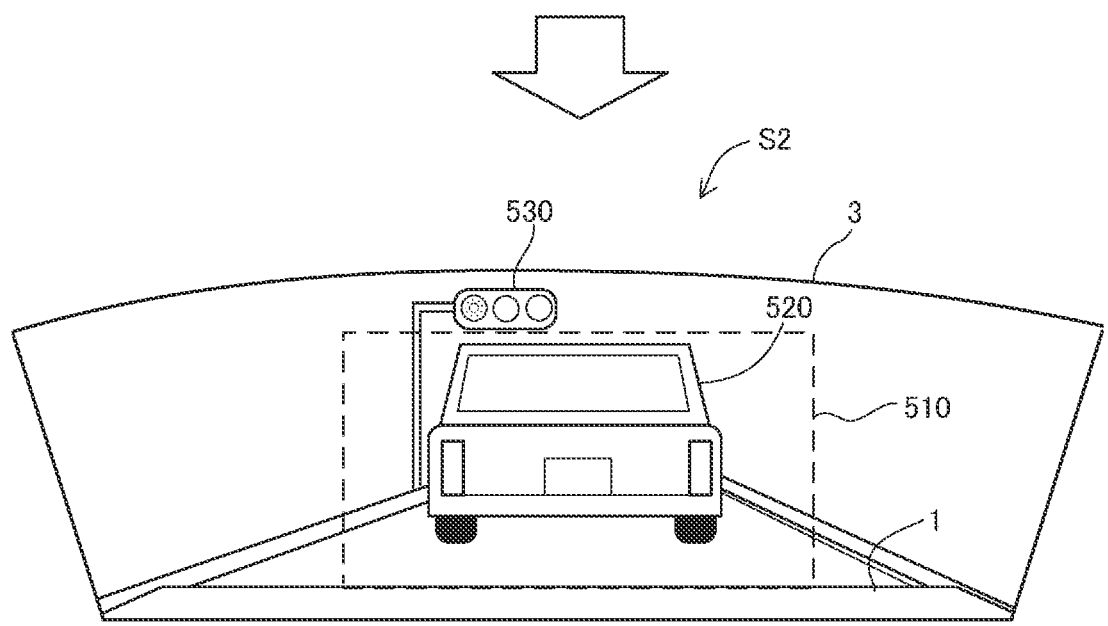

FIG. 9 shows a situation where a preceding vehicle 520 (which corresponds to the second preceding vehicle of the present invention) of the subject vehicle 1 is stopped because of a stop indication (such as glowing of red light) of a traffic signal 530. The preceding-vehicle start notification control unit 53 recognizes the indication state of the traffic signal 530 based on an image captured by the front camera 60. Note that the indication state of the traffic signal 530 may be recognized by road-to-vehicle communication between the traffic signal 530 and the vehicle 1. Also, the preceding-vehicle start notification control unit 53 recognizes that the preceding vehicle 520 has started based on a change in the position of the preceding vehicle 520 detected by the radar 61.

When the indication of the traffic signal 530 transitions from the stop indication to a proceed indication (such as glowing of green light) and the preceding vehicle 520 has started, the preceding-vehicle start notification control unit 53 notifies the driver of the vehicle 1 that the preceding vehicle 520 has started such as by outputting a guidance voice from a speaker (not shown).

The attention load reduction region setting unit 21 sets, as an attention load reduction region 510 (which corresponds to a third region of the present invention), an area including the preceding vehicle 520 and excluding the traffic signal 500 as shown in S1 of FIG. 9. The target object position recognizing unit 22 recognizes the position of the attention load reduction region 510. Then, the display control unit 23 causes the HUD 62 to display a virtual image 510a of the attention load reduction region 510 as overlapping the attention load reduction region 510 based on the position of the attention load reduction region 510 recognized by the target object position recognizing unit 22. In this case, the display control unit 23 sets the conspicuity of the virtual image 510a of the attention load reduction region 510 to be lower than that of surrounding regions. This allows the driver of the stopping subject vehicle 1 to pay attention to the traffic signal 530 with higher priority rather than the preceding vehicle 520.

When the preceding-vehicle start notification control unit 53 recognizes that the traffic signal 530 switches to the proceed indication and the preceding vehicle 520 has started, the display control unit 23 ends the displaying of the virtual image 510a of the attention load reduction region 510 as shown in S2 of FIG. 9. This allows the driver of the subject vehicle 1 to recognize that the preceding vehicle 520 has started and to be urged to start the subject vehicle 1 quickly.

6. Other Embodiments

Although the display control unit 23 displays the virtual image 310a of the attention load reduction region 310 and the virtual image 320a of the preceding vehicle 320 inside the attention load reduction region 310 as shown in FIG. 6 during operation of the following-distance maintaining function in the above embodiment, only either one of the virtual images may be displayed.

Although the above embodiment shows the following-distance maintaining function, the lane maintaining function, and the preceding-vehicle start notification function as examples of the drive assisting functions, the present invention can be applied to other drive assisting functions as long as an attention load reduction region occurs due to a drive assisting function exerted by operating the drive assisting function device.

Figure 10:
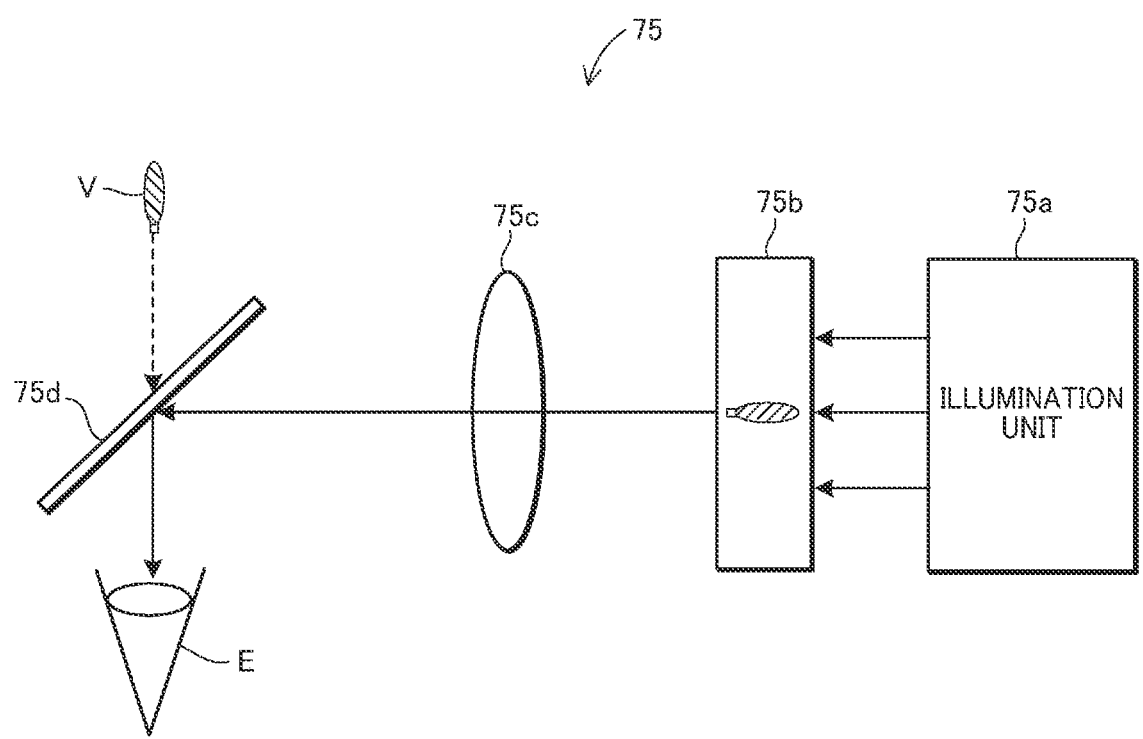
FIG. 10 is an illustrative diagram of a head mounted display.

Although the display control unit 23 performs the attention calling process by controlling the image display on the HUD 62 in the above embodiment, the attention calling process may be performed by controlling the image display on the HMD 75. Here, the configuration of the HMD 75 will be described with reference to FIG. 10. The HMD 75 includes a display panel 75b provided in goggles (not shown) worn by the driver, an illumination unit 75a arranged on the rear side of the display panel 75b for irradiating the display panel 75b with illumination light, an optically transmissive reflective mirror 75d, and a projection lens 75c provided between the display panel 75b and the reflective mirror 75d. The reflective mirror 75d reflects half of light and transmits half, for example, so that the driver can see the external view of the vehicle.

Then, the light output from the illumination unit 75a is output to an eye E of the driver through the display panel 75b via the projection lens 75c and the reflective mirror 75d, so that an image displayed on the display panel 75b is directly formed on the retina of the eye E of the driver. In this manner, the eye E of the driver recognizes a virtual image V at a remote position corresponding to the length of the light path. Thus, as with the HUD 62 described above, the HMD 75 allows the driver to visually recognize the virtual image of the target object overlapping the target object.

Note that FIG. 1 is a schematic diagram showing the configuration of the attention calling device 10 divided by major processes for facilitating the understanding of the present invention, and the attention calling device 10 may be configured with another division. The process of each component may be performed by one hardware unit or may be performed by a plurality of hardware units. The process of each component shown in FIG. 4 may be performed by one program or may be performed by a plurality of programs.

7. Configurations Supported by Above Embodiment

The above embodiment is a specific example of the following configurations.

(First item) An attention calling device including: a processor configured to execute a target object position recognizing process that recognizes a position of a target object in front of a subject vehicle, and a display control process that controls image display on a display device provided in the subject vehicle and performs an attention calling process to cause the display device to display a virtual image corresponding to the target object such that the virtual image is visually recognized by a driver of the subject vehicle as overlapping the target object based on the position of the target object recognized by the target object position recognizing process, wherein the processor executes an attention load reduction region setting process that sets an attention load reduction region that is a region monitored by a drive assisting device comprised in the subject vehicle according to a drive assisting function exerted by operating the drive assisting device, regards the attention load reduction region as the target object and recognizes a position of the attention load reduction region in the target object position recognizing process, and performs the attention calling process by displaying the virtual image for the attention load reduction region in such a manner that conspicuity of the virtual image is lower than a region other than the attention load reduction region based on the position of the attention load reduction region recognized by the target object position recognizing process during operation of the drive assisting device in the display control process.

According to the attention calling device of the first item, an attention load reduction region that is a region monitored by a drive assisting device is set according to a drive assisting function exerted by operating the drive assisting device, and a display control unit performs an attention calling process by displaying a virtual image of the attention load reduction region in such a manner that conspicuity of the virtual image is lower than a region other than the attention load reduction region based on a position of the attention load reduction region recognized by the target object position recognizing unit during operation of the drive assisting device. In this manner, it can be expected that the driver pays attention to the outside of the attention load reduction region with higher priority, and thus it is possible to call attention more appropriately according to how the driver's attention load is reduced by operating the drive assisting function.

(Second item) The attention calling device according to the first item, wherein the processor regards an object positioned in front of the subject vehicle as the target object and recognizes a position of the object in the target object position recognizing process, and when the position of the object is recognized by the target object position recognizing process during operation of the drive assisting device, the processor performs the attention calling process by displaying the virtual image of the object in a first display manner when the position of the object is outside the attention load reduction region, and performs the attention calling process by displaying the virtual image of the object in a second display manner with lower conspicuity than the first display manner when the position of the object is inside the attention load reduction region.

According to the attention calling device of the second item, it is possible to attract the driver's attention to an object located outside the attention load reduction region rather than an object located inside the attention load reduction region to call attention.

(Third item) An attention calling device including: a processor configured to execute a target object position recognizing process that recognizes a position of a target object present in front of a subject vehicle, and a display control process that controls image display on a display device provided in the subject vehicle and performs an attention calling process to cause the display device to display a virtual image corresponding to the target object such that the virtual image is visually recognized by a driver of the subject vehicle as overlapping the target object based on the position of the target object recognized by the target object position recognizing process, wherein the processor executes an attention load reduction region setting process that sets an attention load reduction region that is a region monitored by a drive assisting device comprised in the subject vehicle according to a drive assisting function exerted by operating the drive assisting device, the processor regards an object positioned in front of the subject vehicle as the target object and recognizes a position of the object in the target object position recognizing process, and when the position of the object is recognized by the target object position recognizing process during operation of the drive assisting device, the processor performs the attention calling process by displaying the virtual image corresponding to the object in a second display manner in which conspicuity of the virtual image is lower than a region other than the attention load reduction region when the position of the object is inside the attention load reduction region in the display control process.

According to the attention calling device of the third item, an attention load reduction region that is a region monitored by the drive assisting device is set according to a drive assisting function exerted by operating the drive assisting device. When the position of an object is inside the attention load reduction region, the display control unit performs the attention calling process by displaying a virtual image of the object in a second display manner in which conspicuity of the virtual image is lower than a region other than the attention load reduction region. In this manner, it is possible to attract the driver's attention to an object located outside the attention load reduction region rather than an object located inside the attention load reduction region to call attention.

(Fourth item) The attention calling device according to any one of the first to third items, wherein the drive assisting function of the drive assisting device is a following-distance maintaining function for recognizing a position of a first preceding vehicle traveling in front of the subject vehicle and allowing the subject vehicle to follow the first preceding vehicle while maintaining a following distance to the first preceding vehicle, and the processor sets, as the attention load reduction region, a first region based on the position of the first preceding vehicle recognized by the drive assisting device having the following-distance maintaining function in the attention load reduction region setting process.

According to the attention calling device of the fourth item, it is possible to attract the driver's attention to the outside of the attention load reduction region rather than the inside of the attention load reduction region while the following-distance maintaining function is operating.

(Fifth item) The attention calling device according to any one of the first to fourth items, wherein the drive assisting function of the drive assisting device is a lane maintaining function for recognizing a subject-vehicle lane in which the subject vehicle is traveling and performing steering control of the subject vehicle such that the subject vehicle travels in the subject-vehicle lane, and the processor sets, as the attention load reduction region, a second region based on an area of another lane adjacent to the subject-vehicle lane recognized by the drive assisting device having the lane maintaining function in the attention load reduction region setting process.

According to the attention calling device of the fifth item, it is possible to attract the driver's attention to the outside of the attention load reduction region rather than the inside of the attention load reduction region while the lane maintaining function is operating.

(Sixth item) The attention calling device according to any one of the first to fifth items, wherein the drive assisting function of the drive assisting device is a preceding-vehicle start notification function for recognizing an indication state of a traffic signal in front of the subject vehicle and a traveling condition of a second preceding vehicle in front of the subject vehicle and notifying the driver that the second preceding vehicle has started when a transition occurs from a state where the traffic signal shows a stop indication and the second preceding vehicle is stopped to a state where the traffic signal shows a proceed indication and the second preceding vehicle has started, and the processor sets, as the attention load reduction region, a third region including an area occupied by the second preceding vehicle and excluding an area occupied by the traffic signal in the attention load reduction region setting process.

According to the attention calling device of the sixth item, it is possible to attract the driver's attention to the outside of the attention load reduction region rather than the inside of the attention load reduction region while the preceding-vehicle start notification function is operating.

(Seventh item) The attention calling device according to any one of the first to sixth items, wherein the processor lowers conspicuity of the virtual image by performing at least one of a process of lowering lightness of the virtual image, a process of lowering saturation of the virtual image, and a process of decreasing a difference in hue between the virtual image and a background of the virtual image in the display control process.

According to the attention calling device of the seventh item, the conspicuity of the virtual image can be lowered by adjusting the lightness, saturation, and difference in hue.

(Eighth item) An attention calling method at a computer, the method including: recognizing a position of a target object in front of a subject vehicle; controlling image display on a display device provided in the subject vehicle and performing an attention calling process to cause the display device to display a virtual image corresponding to the target object such that the virtual image is visually recognized by a driver of the subject vehicle as overlapping the target object based on the position of the target object; setting an attention load reduction region that is a region monitored by a drive assisting device comprised in the subject vehicle according to a drive assisting function exerted by operating the drive assisting device; regarding the attention load reduction region as the target object and recognizing a position of the attention load reduction region; and performing the attention calling process by causing the display device to display the virtual image for the attention load reduction region in such a manner that conspicuity of the virtual image is lower than a region other than the attention load reduction region based on the position of the attention load reduction region during operation of the drive assisting device.

By executing the attention calling method of the eighth item by the computer, the configuration of the attention calling device of the first item above can be implemented.

(Ninth item) An attention calling method at a computer, the method including: recognizing a position of a target object present in front of a subject vehicle; controlling image display on a display device provided in the subject vehicle and performing an attention calling process to cause the display device to display a virtual image of the target object such that the virtual image is visually recognized by a driver of the subject vehicle as overlapping the target object based on the position of the target object; setting an attention load reduction region that is a region monitored by a drive assisting device comprised in the subject vehicle according to a drive assisting function exerted by operating the drive assisting device; regarding an object positioned in front of the subject vehicle as the target object and recognizing a position of the object; and performing the attention calling process by displaying the virtual image corresponding to the object in a second display manner in which conspicuity of the virtual image is lower than a region other than the attention load reduction region when the position of the object is recognized during operation of the drive assisting device and the position of the object is inside the attention load reduction region.

By executing the attention calling method of the ninth item by the computer, the configuration of the attention calling device of the third item above can be implemented.

(Tenth item) The attention calling method according to the ninth item, further including at the computer: performing the attention calling process by displaying the virtual image corresponding to the object in a first display manner with higher conspicuity than the second display manner when the position of the object is recognized during operation of the drive assisting device and the position of the object is outside the attention load reduction region.

According to the attention calling method of the tenth item, it is possible to attract the driver's attention to an object present outside the attention load reduction region rather than inside the attention load reduction region.

REFERENCE SIGNS LIST

1 . . . subject vehicle, 2 . . . windshield, 3 . . . display area of HUD, 10 . . . attention calling device, 20 . . . CPU, 21 . . . attention load reduction region setting unit, 22 . . . target object position recognizing unit, 23 . . . display control unit, 30 . . . memory, 31 . . . control program, 50 . . . drive assisting device, 51 . . . following-distance maintaining control unit, 52 . . . lane maintaining control unit, 53 . . . preceding-vehicle start notification control unit, 60 . . . front camera, 61 . . . radar, 62 . . . HUD, 75 . . . HMD

What is claimed is:

1. An attention calling device comprising:
a processor configured to execute
a target object position recognizing process that recognizes a position of a target object in front of a subject vehicle, and
a display control process that controls image display on a display device provided in the subject vehicle and performs an attention calling process to cause the display device to display a virtual image corresponding to the target object such that the virtual image is visually recognized by a driver of the subject vehicle as overlapping the target object based on the position of the target object recognized by the target object position recognizing process, wherein
the processor executes an attention load reduction region setting process that sets an attention load reduction region that is a region monitored by a drive assisting device comprised in the subject vehicle according to a drive assisting function exerted by operating the drive assisting device,
regards the attention load reduction region as the target object and recognizes a position of the attention load reduction region in the target object position recognizing process, and
performs the attention calling process by displaying the virtual image for the attention load reduction region in such a manner that conspicuity of the virtual image is lower than a region other than the attention load reduction region based on the position of the attention load reduction region recognized by the target object position recognizing process during operation of the drive assisting device in the display control process.

2. The attention calling device according to claim 1, wherein
the processor regards an object positioned in front of the subject vehicle as the target object and recognizes a position of the object in the target object position recognizing process, and
when the position of the object is recognized by the target object position recognizing process during operation of the drive assisting device, the processor performs the attention calling process by displaying the virtual image of the object in a first display manner when the position of the object is outside the attention load reduction region, and performs the attention calling process by displaying the virtual image of the object in a second display manner with lower conspicuity than the first display manner when the position of the object is inside the attention load reduction region.

3. An attention calling device comprising:
a processor configured to execute
a target object position recognizing process that recognizes a position of a target object present in front of a subject vehicle, and
a display control process that controls image display on a display device provided in the subject vehicle and performs an attention calling process to cause the display device to display a virtual image corresponding to the target object such that the virtual image is visually recognized by a driver of the subject vehicle as overlapping the target object based on the position of the target object recognized by the target object position recognizing process, wherein
the processor executes an attention load reduction region setting process that sets an attention load reduction region that is a region monitored by a drive assisting device comprised in the subject vehicle according to a drive assisting function exerted by operating the drive assisting device,
the processor regards an object positioned in front of the subject vehicle as the target object and recognizes a position of the object in the target object position recognizing process, and
when the position of the object is recognized by the target object position recognizing process during operation of the drive assisting device, the processor performs the attention calling process by displaying the virtual image corresponding to the object in a second display manner in which conspicuity of the virtual image is lower than a region other than the attention load reduction region when the position of the object is inside the attention load reduction region in the display control process.

4. The attention calling device according to claim 1, wherein
the drive assisting function of the drive assisting device is a following-distance maintaining function for recognizing a position of a first preceding vehicle traveling in front of the subject vehicle and allowing the subject vehicle to follow the first preceding vehicle while maintaining a following distance to the first preceding vehicle, and
the processor sets, as the attention load reduction region, a first region based on the position of the first preceding vehicle recognized by the drive assisting device having the following-distance maintaining function in the attention load reduction region setting process.

5. The attention calling device according to claim 1, wherein the drive assisting function of the drive assisting device is a lane maintaining function for recognizing a subject-vehicle lane in which the subject vehicle is traveling and performing steering control of the subject vehicle such that the subject vehicle travels in the subject-vehicle lane, and the processor sets, as the attention load reduction region, a second region based on an area of another lane adjacent to the subject-vehicle lane recognized by the drive assisting device having the lane maintaining function in the attention load reduction region setting process.

6. The attention calling device according to claim 1, wherein the drive assisting function of the drive assisting device is a preceding-vehicle start notification function for recognizing an indication state of a traffic signal in front of the subject vehicle and a traveling condition of a second preceding vehicle in front of the subject vehicle and notifying the driver that the second preceding vehicle has started when a transition occurs from a state where the traffic signal shows a stop indication and the second preceding vehicle is stopped to a state where the traffic signal shows a proceed indication and the second preceding vehicle has started, and the processor sets, as the attention load reduction region, a third region including an area occupied by the second preceding vehicle and excluding an area occupied by the traffic signal in the attention load reduction region setting process.

7. The attention calling device according to claim 1, wherein the processor lowers conspicuity of the virtual image by performing at least one of a process of lowering lightness of the virtual image, a process of lowering saturation of the virtual image, and a process of decreasing a difference in hue between the virtual image and a background of the virtual image in the display control process.

8. An attention calling method comprising: at a computer:

recognizing a position of a target object in front of a subject vehicle;

controlling image display on a display device provided in the subject vehicle and performing an attention calling process to cause the display device to display a virtual image corresponding to the target object such that the virtual image is visually recognized by a driver of the subject vehicle as overlapping the target object based on the position of the target object;

setting an attention load reduction region that is a region monitored by a drive assisting device comprised in the subject vehicle according to a drive assisting function exerted by operating the drive assisting device;

regarding the attention load reduction region as the target object and recognizing a position of the attention load reduction region; and performing the attention calling process by causing the display device to display the virtual image for the attention load reduction region in such a manner that conspicuity of the virtual image is lower than a region other than the attention load reduction region based on the position of the attention load reduction region during operation of the drive assisting device.

9. An attention calling method comprising: at a computer:

recognizing a position of a target object present in front of a subject vehicle;

controlling image display on a display device provided in the subject vehicle and performing an attention calling process to cause the display device to display a virtual image of the target object such that the virtual image is visually recognized by a driver of the subject vehicle as overlapping the target object based on the position of the target object;

setting an attention load reduction region that is a region monitored by a drive assisting device comprised in the subject vehicle according to a drive assisting function exerted by operating the drive assisting device;

regarding an object positioned in front of the subject vehicle as the target object and recognizing a position of the object; and performing the attention calling process by displaying the virtual image corresponding to the object in a second display manner in which conspicuity of the virtual image is lower than a region other than the attention load reduction region when the position of the object is recognized during operation of the drive assisting device and the position of the object is inside the attention load reduction region.

10. The attention calling method according to claim 9, further comprising: at the computer:

performing the attention calling process by displaying the virtual image corresponding to the object in a first display manner with higher conspicuity than the second display manner when the position of the object is recognized during operation of the drive assisting device and the position of the object is outside the attention load reduction region.

* * * * *